Oct. 7, 1947.  J. C. COOLEY  2,428,513
PORTABLE MINE CONVEYER
Filed July 11, 1945  2 Sheets-Sheet 1
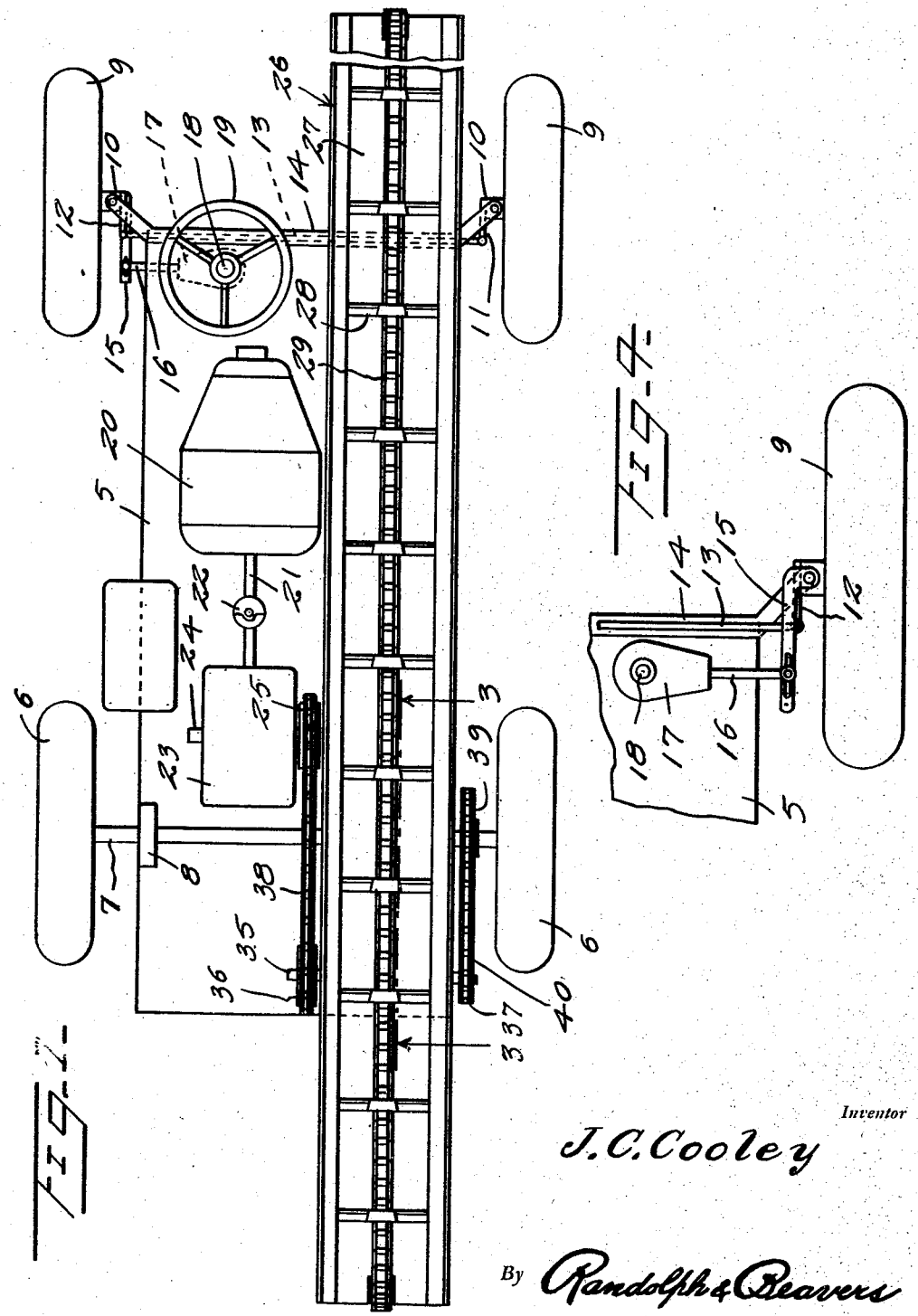
Inventor
J. C. Cooley
By Randolph & Beavers
Attorneys Oct. 7, 1947.  J. C. COOLEY  2,428,513
PORTABLE MINE CONVEYER
Filed July 11, 1945  2 Sheets-Sheet 2
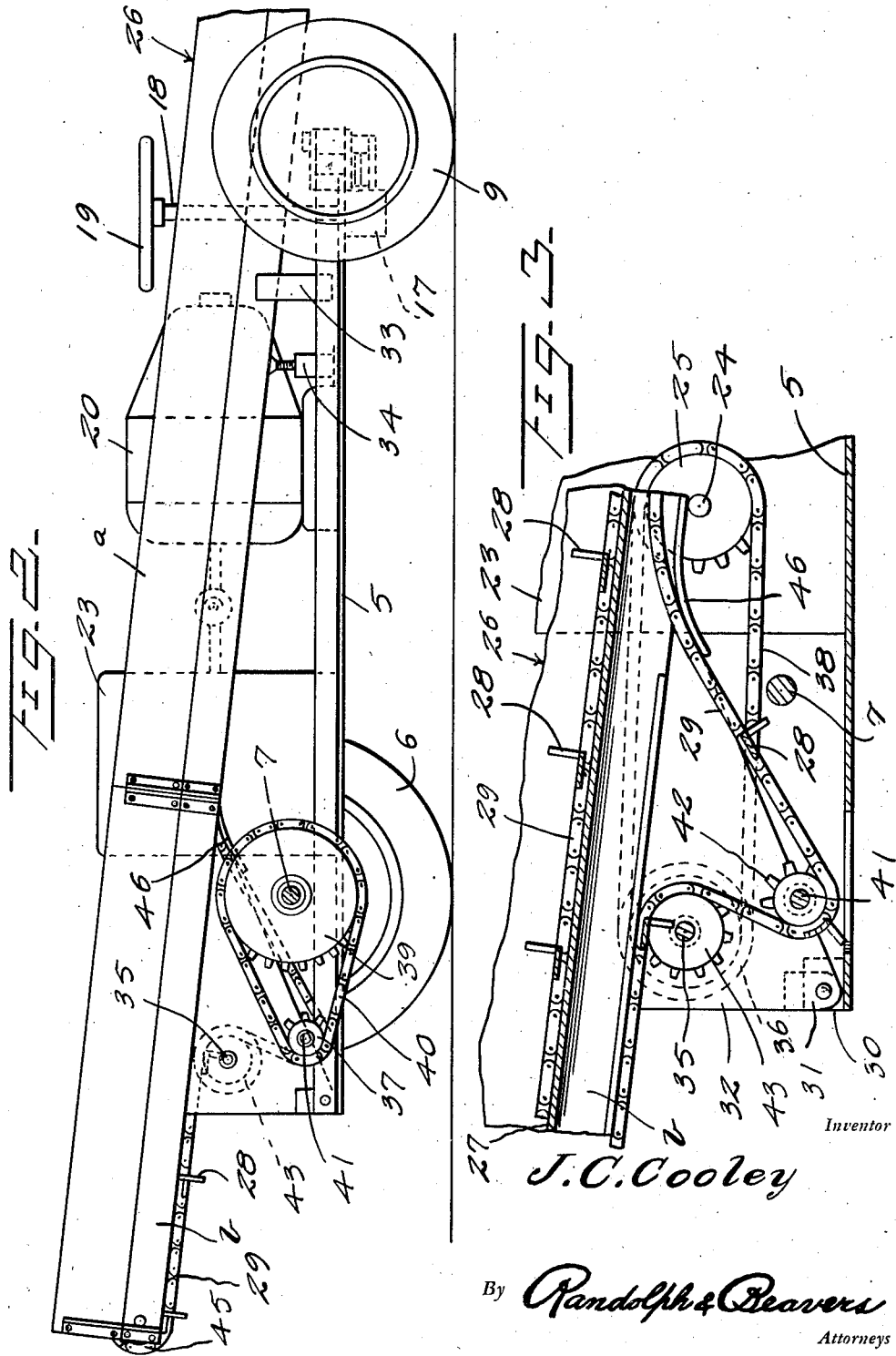
Inventor
J. C. Cooley
By Randolph & Beavers
Attorneys Patented Oct. 7, 1947

2,428,513

UNITED STATES PATENT OFFICE 2,428,513

PORTABLE MINE CONVEYER

Jake C. Cooley, Drift, Ky.

Application July 11, 1945, Serial No. 604,310

1 Claim. (Cl. 198—233)

The present invention appertains to improvements in conveyor assemblies for coal mines and mines of other types, the principal object being to provide an assembly head of mobile construction and having a drive inwardly of its receiving end so as to not interfere with operations.

Another important object of the invention is to provide a mobile conveyor assembly for mines which will permit easy maneuverability and a much more ready approach to the loading site than is now possible with the skid or sled type of conveyor head now in general use.

These and various other important objects and advantages of the invention will become apparent to the reader of the following description.

In the drawings—

Figure 1 is a top plan view of the machine.

Figure 2 is a side elevational view.

Figure 3 is a fragmentary enlarged detailed sectional view taken on line 3—3 of Figure 1.

Figure 4 is a fragmentary bottom plan view showing the steering means.

Referring to the drawings wherein like numerals designate like parts, it can be seen that numeral 5 denotes a bed or platform supported by wheels 6, 6 keyed or otherwise secured to an axle 7, which axle is journaled through suitable bearings 8 on the platform 5.

The platform 5 is also supported by steerable wheels 9, 9, the same having stub shafts 10 provided with arms 11, 12 which are connected by a tie rod 13 operating through a glide tube or the like 14 at one end of the platform 5.

The arm 13 has an arm extension 15 which is adjustably and pivotally connected to a rod 16, which may have a rack thereon operating in a box 17 and with which a gear or pinion (not shown) on a steering shaft 18 meshes, the steering shaft 18 being operated by steering wheel 19. Thus the wheels 9, 9 can be steered to maneuver the vehicle into the desired loading position.

On the platform 5 is a power plant such as an electric motor 20 having a drive shaft 21, which may be interrupted by a universal joint 22.

In a housing 23 is preferably located speed reduction gears for reducing the speed between the shaft 21 and a shaft 24 on which is a sprocket wheel 25.

Numeral 26 denotes an elongated conveyor pan having a floor 27 along which the pusher members 28 of a conveyor chain 29 slide.

On the platform 5 are uprights 30 at a pair of opposed corners with which ears 31 on the lower portions of side walls 32 cooperate, the side walls 32 depending from the conveyor pan 27. The opposite end portion of the platform 5 has a rest 33 for this particular end of the conveyor pan and adjacent the rest 33 a jack 34 is provided for holding the pan at the desired elevation and inclination.

Journaled through the side walls 32 is a shaft 35 having a sprocket 36 at one end and a sprocket wheel 37 at its opposite end. A sprocket chain 38 is trained over the sprockets 36 and 25.

On the axle 7 is a sprocket wheel 39 and over this and the sprocket wheel 37 a sprocket chain 40 is trained.

Also journaled between the side walls 32 is a shaft 41 on which is a sprocket wheel 42. A substantially overlying sprocket wheel 43 is located on the shaft 35, between the side walls 32.

As has been explained in my patent application Ser. No. 607,412, filed July 27, 1945, the pan 26 includes side walls $a$ and a guideway $b$ therebetween and underlying the bottom 27. The conveyor chain 29 extends along the top of the bottom 27, over a wheel 45 at one end, and then under this particular loading end of the conveyor head to pass over the ratchet wheel 43 and downwardly and under the ratchet wheel 42, then inclines upwardly over a downwardly curved lip 46 to pass into the guideway $b$ where it continues to the other end of the conveyor pan, as suggested in Figures 3 and 1.

It can now be seen, that by having the drive located inwardly of the working end of the conveyor, the drive will not interfere with the use of this end of the conveyor head as might occur should the drive be to the extreme end of the pan.

Obviously when the conveyor is in use and it is not desired that the machine be moved about, the chain 40 is disconnected from the sprocket wheel 37.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A mine conveyor comprising a platform, steerable wheels at one end of the platform, an axle disposed transversely at the other end of the platform and provided with traction wheels at the ends thereof, a conveyor trough supported upon the platform, an endless conveyor associated with the trough and having its upper flight moving upon the trough and its under flight passing under the trough, a supporting structure on the platform for the trough, a horizontal shaft supported by the supporting structure, said conveyor including a longitudinal chain, a sprocket on the shaft over which the chain is trained, a power plant on the platform, a detachable drive connection between the power plant and the shaft, said axle being provided with a sprocket wheel, a countershaft supported by the supporting structure and provided with a sprocket wheel thereon, a sprocket chain trained over the sprocket wheels last mentioned and being removable with respect thereto, said countershaft being provided with a second sprocket wheel, said conveyor chain being trained downwardly and under said sprocket wheel on the countershaft last mentioned.

JAKE C. COOLEY.

REFERENCES CITED

The following references are of record in the file of this patent:

UNITED STATES PATENTS

| Number | Name | Date |
| --- | --- | --- |
| 1,892,495 | Vorthmann | Dec. 27, 1932 |
| 1,997,588 | Levin | Apr. 16, 1935 |

FOREIGN PATENTS

| Number | Country | Date |
| --- | --- | --- |
| 314,598 | Great Britain | July 4, 1929 |